(12) United States Patent
Bassov

(10) Patent No.: US 10,409,776 B1
(45) Date of Patent: Sep. 10, 2019

(54) SPACE-EFFICIENT PERSISTENT BLOCK RESERVATION

(71) Applicant: EMC IP Holding Company LLC, Hopkinton, MA (US)

(72) Inventor: Ivan Bassov, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 457 days.

(21) Appl. No.: 15/085,541

(22) Filed: Mar. 30, 2016

(51) Int. Cl.
 *G06F 16/17* (2019.01)
 *G06F 16/182* (2019.01)

(52) U.S. Cl.
 CPC ...... *G06F 16/1727* (2019.01); *G06F 16/1827* (2019.01)

(58) Field of Classification Search
 CPC ..... G06F 1/203; G06F 3/0688; G06F 16/1727
 See application file for complete search history.

(56) References Cited

U.S. PATENT DOCUMENTS

| | | | |
|---|---|---|---|
| 8,479,046 B1* | 7/2013 | Bailey | G06F 11/1088 714/2 |
| 9,696,906 B1 | 7/2017 | Bassov et al. | |
| 9,846,544 B1 | 12/2017 | Bassov | |
| 2014/0258670 A1* | 9/2014 | Venkatasubramanian | G06F 12/023 711/171 |
| 2015/0178019 A1* | 6/2015 | Hegdal | G06F 3/0664 711/170 |
| 2016/0026501 A1 | 1/2016 | Polkovnikov et al. | |
| 2016/0277233 A1 | 9/2016 | Kozlovsky | |

OTHER PUBLICATIONS

Ivan Bassov; "Space-Efficient Persistent Block Reservation Optimized for Compression," U.S. Appl. No. 15/086,751, filed Mar. 31, 2016.

\* cited by examiner

*Primary Examiner* — Mariela Reyes
*Assistant Examiner* — Courtney Harmon
(74) *Attorney, Agent, or Firm* — BainwoodHuang

(57) ABSTRACT

A method of operating a data storage system to provision space on a volume on which a set of filesystems rest includes (a) storing data in a set of files of the set of filesystems, files of a first subset being marked as thick files and files of a second subset being marked as thin files, and (b) reserving backing store for the volume. Reserving backing store includes (1) summing, over all the files of the first subset, a block representation of the filesize of each file, yielding a first sum, (2) summing, over all files of the second subset, a number of filesystem blocks of each file that store active file data, yielding a second sum, (3) calculating a reservation size by summing the first and sums, and (4) providing a number of blocks of backing store for the volume equal to at least the calculated reservation size.

11 Claims, 4 Drawing Sheets

SPACE-EFFICIENT PERSISTENT BLOCK RESERVATION

BACKGROUND

Data storage systems (DSSes) store large quantities of data logically arranged onto many logical disks accessible to host devices. Traditional DSSes assigned each logical disk a size at creation time, allocating space from physical storage at that time in what is known as "thick provisioning." Some newer DSSes allow logical disks to be thinly-provisioned by dynamically assigning more or less underlying physical storage to the logical disks as needed.

Some newer DSSes create and manage filesystems on all or some of their logical disks. Traditionally these filesystems were thickly-provisioned as well. Even when a filesystem is thickly-provisioned, however, the size of its underlying storage may vary as new files are created and resized. In addition, in more complex filesystems that share blocks between several files, the amount of underlying storage that is required may vary as files are written to, even when they are not being resized. In addition, in some newer systems, filesystems may also be thinly-provisioned.

SUMMARY

Unfortunately, thickly-provisioned filesystems utilizing shared blocks are very difficult to provision correctly. This problem is exacerbated when attempting to create a hybrid thick/thin filesystem in which some files are provisioned thinly, while other files are provisioned thickly, using a technique referred to as Persistent Block Reservation (PBR). A simplistic approach may commonly over-provision storage to filesystems employing PBR.

Thus, it would be desirable to provide techniques for more efficiently provisioning storage to filesystems employing PBR without wasting space. This may be accomplished by using two different techniques for estimating necessary provisioning and reserving space based on the minimum such estimate. One technique involves summing a block filesize of all thick files of the filesystem plus a number of filesystem blocks of each thin file that store active file data. The other technique involves summing a number of blocks of backing store actually used by all files combined plus a file liability of each thick file.

In one embodiment, a method is provided of operating a data storage system to provision space on a volume on which a set of filesystems rest. The method includes (a) storing data in a set of files of the set of filesystems, the set of files being partitionable into a first subset and a second subset, files of the first subset being marked as thick files and files of the second subset being marked as thin files, files marked as thick each having guaranteed backing store up to a filesize of that file, files marked as thin lacking a guarantee of backing store beyond space actually used by those files and (b) reserving backing store for the volume. Reserving backing store for the volume includes (1) summing, over all the files of the first subset, a block representation of the filesize of each file, yielding a first sum, (2) summing, over all the files of the second subset, a number of filesystem blocks of each file that store active file data, yielding a second sum, (3) calculating a reservation size, wherein calculating the reservation size includes summing the first sum and the second sum, and (4) providing a number of blocks of backing store for the volume equal to at least the calculated reservation size. An apparatus and computer program product for performing a similar method are also provided.

In another embodiment, a method is provided of operating a data storage system to provision space on a volume on which a set of filesystems rest. The method includes (a) storing data in a set of files of the set of filesystems, the set of files being partitionable into a first subset and a second subset, files of the first subset being marked as thick files and files of the second subset being marked as thin files, files marked as thick each having guaranteed backing store up to a filesize of that file, files marked as thin lacking a guarantee of backing store beyond space actually used by those files, at least one file of the set of filesystems sharing a block with another file of the set of filesystems and (b) reserving backing store for the volume. Reserving backing store for the volume includes (1) determining a number of blocks of backing store actually used by all files of the set of files combined, (2) summing, over all the files of the first subset, a block representation of a file liability of each file, yielding a first sum, (3) calculating a reservation size, wherein calculating the reservation size includes summing the determined number of blocks of backing store actually used by all files combined and the first sum, yielding the reservation size, and (4) providing a number of blocks of backing store for the volume equal to at least the calculated reservation size. An apparatus and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for more efficiently provisioning storage to filesystems employing Persistent Block Reservation without wasting space. This may be accomplished by using two different techniques for estimating necessary provisioning and reserving space based on the minimum such estimate. One technique involves summing a block filesize of all thick files of the filesystem plus a number of filesystem blocks of each thin file that store active file data. The other technique involves summing a number of blocks of backing store actually used by all files combined plus a file liability of each thick file.

Figure 1:
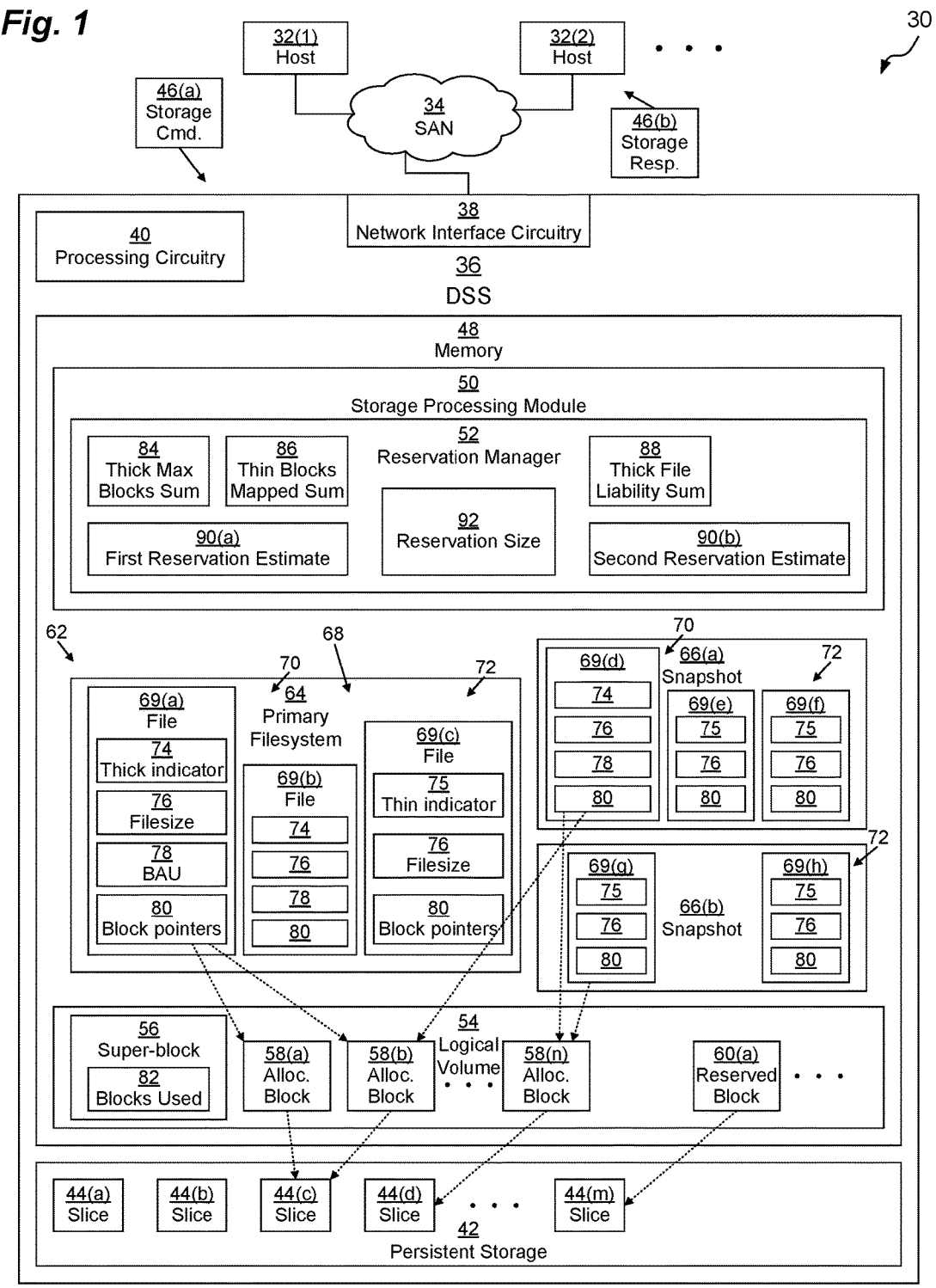
FIG. 1 is a block diagram depicting an example system and apparatus for use in connection with various embodiments.

FIG. 1 depicts a system 30. System 30 includes a set of hosts 32 (depicted as hosts 32(1), . . . , 32(q)) that communicate with a data storage system (DSS) 36 over a network, such as storage area network (SAN) 42.

A host 32 may be any kind of computing device configured to operate on a network, such as, for example, personal computers, workstations, server computers, enterprise servers, laptop computers, tablet computers, smart phones, mobile computers, etc. or combinations thereof. Typically, a host 32 is a server computer or an enterprise server. Hosts 32 issue data storage commands 46(a) and receive data storage responses 46(b) from the DSS 36 in order to read from and write to storage. In some embodiments (not depicted), hosts 32 may run a set of virtual machines which dynamically create and destroy virtual storage volumes on DSS 36.

DSS 36 is a computing device, having network interface circuitry 38, processing circuitry 40, persistent storage 42, and memory 48. DSS 36 may be any kind of computing device, such as, for example, a personal computer, workstation, server computer, enterprise server, laptop computer, tablet computer, smart phone, mobile computer, etc. or combinations thereof. Typically, a DSS 36 is a cabinet-mounted device having two or more storage processors (not depicted) configured to access the persistent storage 42. In a typical arrangement, a storage processor is configured as a board or enclosure mounted within a rack connected to persistent storage 42 also mounted within the rack. These components, in combination, may make up DSS 36.

Network interface circuitry 38 may include one or more Ethernet cards, cellular modems, Fibre Channel (FC) adapters, Wireless Fidelity (Wi-Fi) wireless networking adapters, and other devices for connecting to a network, such as a SAN 42, local area network (LAN), wide area network (WAN), cellular data network, etc. Network interface circuitry 38 is able to communicate with hosts 32. In operation, hosts 32 send data storage commands 46(a) to DSS 36 in order to read from and write to persistent storage 42.

Persistent storage 42 may include one or more of any kind of storage device (not depicted) able to persistently store data, such as, for example, a magnetic hard disk drive, a solid state storage device (SSD), etc. Persistent storage 42 may be arranged as a plurality of RAID groups (not depicted), each made up of one or more storage devices, which may logically combine to create a logical disk (not depicted) having larger size or redundancy features or both, depending on the RAID level, as is well-known in the art. In some embodiments, each logical disk is partitioned into one or more slices 44 (depicted as slices 44(a), 44(b), 44(c), 44(d), . . . , 44(m)). The slices 44 from all logical disks thus forms a pool of slices 44 available for allocation to logical volumes 54. The size of a slice 44 may vary, but in one embodiment, a slice is 256 megabytes, while in another embodiment, a slice is 1 gigabyte.

Processing circuitry 40 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 48 may be any kind of digital system memory, such as, for example, random access memory (RAM). Memory 48 stores one or more operating systems in operation (not depicted, e.g., Linux, UNIX, Windows, MacOS, or a similar operating system), various applications executing on processing circuitry 40 (e.g., storage processing module 50 and its constituent reservation manager 50) as well as data used by those applications. Memory 48 may also store in-memory representations of one or more mounted logical volumes 54 and one or more sets 62 of filesystems 64, 66 mounted on the mounted logical volumes 54.

A logical volume 54 is a logical disk object upon which a primary filesystem 64 and one or more snapshots 66 may rest. In some embodiments, a logical volume 54 may be arranged as a sparse filesystem (e.g., the Container Block Filesystem of the EMC Corporation of Hopkinton, Mass.) having a super-block 56 and files (not depicted). Each file of the sparse filesystem represents a particular filesystem of a set 62 (either a primary filesystem 64 or a snapshot 66) that rests on that logical volume 54. There may be an inode (not depicted) for each such file as well as indirect blocks (not depicted) that point to particular allocated blocks 58 of the sparse filesystem that are assigned to particular such files. There is a mapping layer (not depicted) that makes each such file appear to the upper filesystems 64, 66 as a volume, the mapping layer also taking care of snapshotting. In these embodiments, each logical volume 54 is assigned one or more slices 44 from the pool of persistent storage 42 as backing store. The slices 44 map to logical addresses in the sparse address space of the filesystem of the logical volume 54. Thus, for example, as depicted, both allocated blocks 58(a) and 58(b) are drawn from slice 44(c), while allocated block 58(n) is drawn from slice 44(d). Logical volume 54 may also include reserved blocks 60 in its sparse address space that are not yet assigned to particular files. As depicted, reserved block 60(a) is drawn from slice 44(m). Super-block 56 stores a count of blocks used 82, which represents how many allocated blocks 58 there are within the sparse filesystem (but excluding reserved blocks 60).

Although logical volume 54 has been shown and described as being a Container Block Filesystem, other arrangements are also possible. Thus, it is possible for logical volume 54 to be a volume having an expandable size but storing representations of filesystems 64, 66 of the set 62 in a manner other than as files.

Set 62 include a primary filesystems 64 as well as various snapshots 66 associated with each primary filesystem 64. There may be more than one such set 62, each set 62 resting on a different logical volume 54.

A primary filesystem 64 is a filesystem that is accessible and viewable by a host 32. Writes can be made to a primary filesystem 64. A snapshot 66 represents a prior state of a primary filesystem 64 at a particular moment in time. Snapshots 66 may be created or deleted, but they are generally not written to. It is possible, however, to re-mount a snapshot 66 as a new primary filesystem 64, effectively rolling back subsequent changes made to the primary filesystem 64.

Each filesystem 64, 66 of the set 62 includes one or more files 69, thereby forming a set 68 of files 69 on all filesystems 64, 66 of the set 62 of filesystems 64, 66 that rest on the logical volume 54. Each file 69 includes metadata including either a thick indicator 74 or a thin indicator 75, indicating whether that particular file is thick or thin. This indication 74, 75 encodes Persistent Block Reservation into the filesystems 64, 66. All files 69 with thick indicators 74 belong to a thick subset 70 of the set 68 of files 69. All files 69 with thin indicators 75 belong to a thin subset 72 of the set 68 of files 69. Because each file 69 has one or the other of thin indicator 75 or thick indicator 74, set 62 is partitionable into subsets 70 and 72. It should be understood that the term set, as used herein, refers to a non-null set having at least one member, and the term subset, as used herein, refers to a non-null subset having at least one member.

The metadata of each file 69 also includes a filesize attribute 76, which indicates the size of that file 69. Filesize 76 may be given in various ways, such as, for example, in bytes or blocks. For a thin file 69 of the thin subset 72, the filesize 76 represents data of that file 69 that has already been written. However, for a thick file 69 of the thick subset

70, the filesize 76 represents the maximum amount of space reserved for that file 69 even if only a smaller amount has already been written.

The metadata of each file 69 also includes a set of block pointers 80. These block pointers 80 point to particular allocated blocks of the logical volume 54 (although, in some embodiments, there may some re-mapping done) as is well-known in the art. In some embodiments, the block pointers 80 may include some direct block pointers 80 in an inode (not depicted) of the file as well as some block pointers in indirect blocks (not depicted) of the file 69.

Thus, for example, as depicted, thick file 69(*a*) of primary filesystem 64 has a first block pointer 80 for a first address within the file 69(*a*) point to allocated block 58(*a*) of the logical volume 54 and a second block pointer 80 for a second address within the file 69(*a*) point to allocated block 58(*b*) of the logical volume 54. The corresponding file 69(*d*) on snapshot 66(*a*) represents a prior state of the file 69(*a*). A block pointer 80 for the second address within the file 69(*d*) point to the same allocated block 58(*b*) of the logical volume 54, the data at that second address not having changed between the time of snapshot 66(*a*) and the current time. However, as depicted, the data at the first address of file 69(*a*) has changed since snapshot 66(*a*) was taken, so a block pointer 80 for the first address within the file 69(*d*) points to a different allocated block 58(*n*) of the logical volume 54, representing the previous state of the data at that address. The corresponding file 69(*g*) on snapshot 66(*b*) represents an even earlier state of the file 69(*a*). This file 69(*g*) was shorter than files 69(*a*), 69(*d*), not having any data yet stored at the second address. Thus, a block pointer 80 for the first address within the file 69(*g*) points to the same allocated block 58(*n*) of the logical volume 54 as does the block pointer 80 for the first address within the file 69(*d*), but the block pointer for the second address of the file 69(*g*) does not point to any allocated block 58.

As depicted, primary filesystem 64 includes two thick files 69(*a*), 69(*b*) and one thin file 69(*c*). Snapshot 66(*a*) represents a prior state of the primary filesystem 64 with thick file 69(*d*) corresponding to thick file 69(*a*), thin file 69(*e*) corresponding to thick file 69(*b*), and thin file 69(*f*) corresponding to thin file 69(*c*). Snapshot 66(*b*) represents an even earlier state of the primary filesystem 64 with thin file 69(*g*) corresponding to thick file 69(*a*) and thin file 69(*h*) corresponding to thin file 69(*c*), with no previous version of thick file 69(*b*) having being created yet on snapshot 66(*b*). In some embodiments, snapshots 66 may contain only thin files 69 of the thin subset 72 (see, e.g., snapshot 66(*b*)), while in other embodiments, snapshots 66 may contain both thin files 69 of the thin subset 72 and thick files 69 of the thick subset 70 (see, e.g., snapshot 66(*a*)).

The metadata of each thick file 69 of the thick subset 70 also includes a blocks-allocated-uniquely (BAU) counter 78. BAU counter 78 indicates a count of all allocated blocks 58 pointed to by block pointers 80 of that thick file 69 which are not pointed to by any other files 69 of the set 68 of files 69.

In some embodiments, it is possible for two files 69 of the set 68 to share one or more allocated blocks 58 even if the two files that share the allocated block(s) 58 are both on the primary filesystem 64 or both on a single snapshot 66. This is possible in the event that a replica is created of a file 69. It is also possible in the event that deduplication is performed.

Storage processing module 50 manages the sets 62 of filesystems 64, 66, executing storage commands 46(*a*) received from hosts 32, issuing read and write requests to the logical volumes 54, and performing a reservation function. The reservation function is performed by the reservation manager 52 of the storage processing module 50.

Reservation manager 52 calculates a reservation size 92 for each set 62 of filesystems 64, 66 and requests that the logical volume 54 for that set 62 be provisioned with at least as much storage as the reservation size 92.

In one embodiment, reservation manager 52 calculates reservation size 92 by making two reservation estimates 90 and setting the smaller value as the reservation size 92. In another embodiment, reservation manager 52 may calculate only one or the other of reservation estimate 90(*a*), 90(*b*), setting that value as the reservation size 92.

In some embodiments, reservation manager 52 calculates the first reservation estimate 90(*a*) by calculating a Thick Max Blocks Sum 84 and a Thin Blocks Mapped Sum 86, and setting the sum of those two values as the first reservation estimate 90(*a*).

Reservation manager 52 calculates the Thick Max Blocks sum 84 with reference to the filesize 76 of all thick files 69 of the thick subset 70. Reservation manager 52 determines a maximum number of blocks required to store a file 69 of the given filesize 76. If the filesize 76 is given in blocks, this determination may be as simple as using the filesize as the maximum number of blocks required to store a file 69 of the given filesize 76. If, however, the filesize is given in blocks, the determination may involve dividing the given filesize by a block size (e.g., 8 kilobytes), and taking the ceiling function (e.g., rounding up to the next integer if the filesize is not evenly-divisible by the block size). In some embodiments, reservation manager 52 may also add in a maximum number of metadata blocks (e.g., indirect blocks for storing block pointers 80) needed for a file of the given filesize 76. In other embodiments, metadata is stored in a separate tier of storage, so the metadata reservation may be calculated separately. Reservation manager 52 sums the determined maximum number of blocks required to store each file 69 of the given filesize 76 over all thick files 69 of the thick subset 70.

Reservation manager 52 calculates the Blocks Mapped Sum 86 by summing the number of non-null (or otherwise non-invalid) block pointers 80 within the metadata of all thin files 69 of the thin subset 72.

In some embodiments, reservation manager 52 calculates the second reservation estimate 90(*b*) by calculating a Thick File Liability Sum 88 and summing that value together with the count of blocks used 82 from the super-block 56 of the logical volume 54.

Reservation manager 52 calculates the Thick File Liability Sum 88 with reference to a file liability of each thick file 69 of the thick subset 70. Reservation manager 52 determines the file liability of each thick file 69 of the thick subset 70 by subtracting the BAU counter 78 for that file 69 from a determined maximum number of blocks required to store that file 69 having a given filesize 76 (calculated in the same manner as discussed above in connection with calculating the Thick Max Blocks Sum 84).

In some embodiments, memory 48 may also include a persistent storage portion (not depicted). Persistent storage portion of memory 48 may be made up of one or more persistent storage devices, such as, for example, hard disk drives, solid-state storage devices, flash drives, etc. Persistent storage of memory 48 is configured to store programs and data even while the DSS 36 is powered off. The OS (e.g., Linux, UNIX, Windows, or a similar operating system) and the applications (e.g., storage processing module 50, reservation manager 52, etc.) are typically stored in persistent storage (either persistent storage of memory 48 or in persistent storage 42) so that they may be loaded into a system portion of memory 48 from persistent storage upon a system restart. These applications, when stored in non-transient form either in the volatile portion of memory 48 or in persistent storage, form a computer program product. The processing circuitry 40 running one or more of these applications thus forms a specialized circuit constructed and arranged to carry out the various processes described herein.

Figure 2:
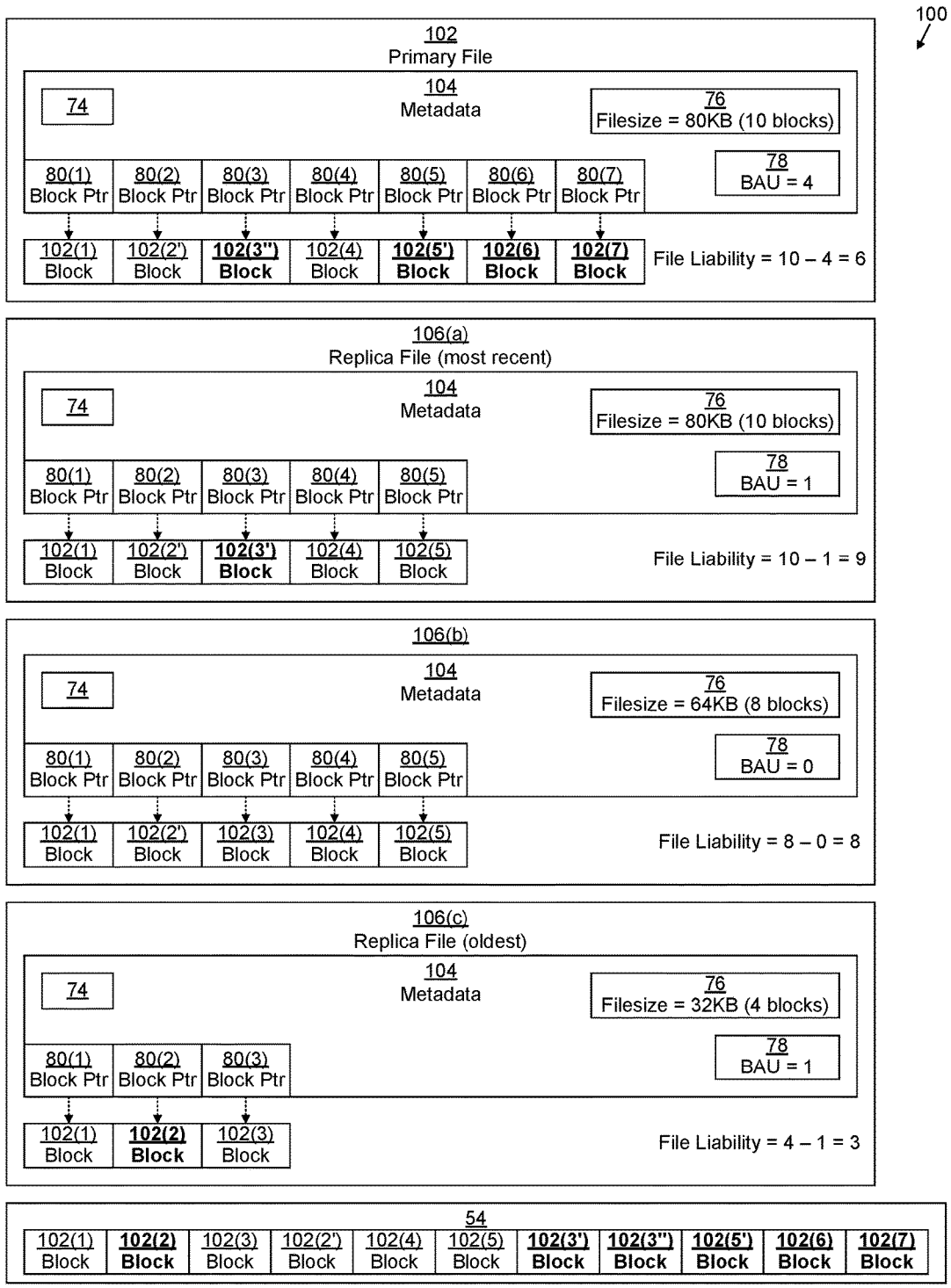
FIG. 2 is a block diagram depicting example file layouts and respective underlying storage in connection with various embodiments.

FIG. 2 depicts an example arrangement 100 of a primary file 102 and a set of replica files 106 (depicted as replica files 106(a), 106(b), 106(c)), which may be, for example, corresponding files 69 on snapshots 66. FIG. 2 also depicts a corresponding arrangement of allocated blocks 58 (depicted as blocks 102 within logical volume 54) related to files 102, 106.

Replica file 106(c) represents an oldest extant replica of primary file 102. As depicted, replica file 106(c) is a thick file, having the thick indicator 74 within its metadata 104. In addition, metadata 104 of replica file 106(c) also stores its filesize 76, BAU counter 78, and block pointers 80. As depicted, replica file 106(c) has a maximum filesize of 32 kilobytes, which corresponds to four 8-KB blocks. The first three block offsets of the file 106(c) are mapped to particular blocks 102(1), 102(2), 102(3) by block pointers 80(1), 80(2), 80(3), respectively, within metadata 104 of the file 106(c). However, as depicted, the fourth block offset of the file 106(c), although allocated, is not yet mapped to any block 102. Thus, currently, block pointer 80(4) does not yet exist (or it may exist, but it is null or otherwise invalid).

Replica file 106(b) represents a next-oldest extant replica of primary file 102. As depicted, replica file 106(b) is a thick file, having the thick indicator 74 within its metadata 104. In addition, metadata 104 of replica file 106(b) also stores its filesize 76, BAU counter 78, and block pointers 80. As depicted, replica file 106(b) has a maximum filesize of 64 kilobytes, which corresponds to eight 8-KB blocks. The first five block offsets of the file 106(b) are mapped to particular blocks 102(1), 102(2'), 102(3), 102(4), 102(5) by block pointers 80(1), 80(2), 80(3), 80(4), 80(5), respectively, within metadata 104 of the file 106(b). However, as depicted, the sixth, seventh, and eighth block offsets of the file 106(b), although allocated, are not yet mapped to any blocks 102. Thus, currently, block pointers 80(6)-80(8) do not yet exist (or they may exist, but they are null or otherwise invalid). Replica file 106(b) differs from replica file 106(c) in that the filesize 76 has been increased, blocks 102(4), 102(5) have been appended to the end at block offsets four and five, respectively, and the second block offset has been overwritten with new block 102(2').

Replica file 106(a) represents a most-recent replica of primary file 102. As depicted, replica file 106(a) is a thick file, having the thick indicator 74 within its metadata 104. In addition, metadata 104 of replica file 106(a) also stores its filesize 76, BAU counter 78, and block pointers 80. As depicted, replica file 106(a) has a maximum filesize of 80 kilobytes, which corresponds to ten 8-KB blocks. The first five block offsets of the file 106(b) are mapped to particular blocks 102(1), 102(2'), 102(3'), 102(4), 102(5) by block pointers 80(1), 80(2), 80(3), 80(4), 80(5), respectively, within metadata 104 of the file 106(a). However, as depicted, the sixth, seventh, eighth, ninth, and tenth block offsets of the file 106(a), although allocated, are not yet mapped to any blocks 102. Thus, currently, block pointers 80(6)-80(10) do not yet exist (or they may exist, but they are null or otherwise invalid). Replica file 106(a) differs from replica file 106(b) in that the filesize 76 has been increased and the third block offset has been overwritten with new block 102(3').

Primary file 102 represents a current state of primary file 102. As depicted, primary file 102 is a thick file, having the thick indicator 74 within its metadata 104. In addition, metadata 104 of primary file 102 also stores its filesize 76, BAU counter 78, and block pointers 80. As depicted, primary file 102 has a maximum filesize of 80 kilobytes, which corresponds to ten 8-KB blocks. The first seven block offsets of the file 102 are mapped to particular blocks 102(1), 102(2'), 102(3"), 102(4), 102(5'), 102(6), 102(7) by block pointers 80(1), 80(2), 80(3), 80(4), 80(5), 80(6), 80(7), respectively, within metadata 104 of the file 102. However, as depicted, the eighth, ninth, and tenth block offsets of the file 102, although allocated, are not yet mapped to any blocks 102. Thus, currently, block pointers 80(8)-80(10) do not yet exist (or they may exist, but they are null or otherwise invalid). Primary file 102 differs from replica file 106(a) in that blocks 102(6), 102(7) have been appended to the end at block offsets six and seven, respectively, and the third block offset has been overwritten again with new block 102(3").

All the blocks 102 that are still pointed to by at least one block pointer 80 within either the primary file 102 or any of the replica files 106 may be found within the logical volume 54. They are depicted within the logical volume in the order that they were created, 102(1), 102(2), 102(3), 102(2'), 102(4), 102(5), 102(3'), 102(3"), 102(5'), 102(6), 102(7). Thus, there are 11 blocks 102 allocated on logical volume for the family of files 102, 106(a), 106(b), 106(c). Certain blocks 102(2), 102(3'), 102(3"), 102(5'), 102(6), 102(7) are marked in bold because they are only pointed to by a single block pointer 80, which means that they are allocated uniquely.

Oldest replica file 106(c) has one such uniquely-allocated block 102(2), so its BAU counter 78 is set to 1. Thus, it has a file liability of 4 blocks minus 1 block=3 blocks.

Next-oldest replica file 106(b) has no uniquely-allocated blocks 102, so its BAU counter 78 is set to 0. Thus, it has a file liability of 8 blocks minus 0 blocks=8 blocks.

Most-recent replica file 106(a) has one uniquely-allocated block 102(3'), so its BAU counter 78 is set to 1. Thus, it has a file liability of 10 blocks minus 1 block=9 blocks.

Primary file 102 has four uniquely-allocated blocks 102 (3"), 102(5'), 102(6), 102(7), so its BAU counter 78 is set to 4. Thus, it has a file liability of 10 blocks minus 4 block=6 blocks.

If, for example, logical volume 54 stored only these four files, 102, 106(a), 106(b), 106(c), then its Thick Max Blocks Sum 84 would be 10+10+8+4=32 blocks, its Thin Blocks Mapped Sum 86 would be 0 (because there are no thin files), and its first reservation estimate 90(a) would be 32 blocks. The count of blocks used 82 would be 11 and the Thick File Liability Sum 88 would be 6+9+8+3=26 blocks, so its second reservation estimate 90(b) would be 37 blocks. Thus, the reservation size 92 would be the smaller of 90(a), 90(b), or 32 blocks.

Modifying the example slightly, assume that the replica files 106 were all thin rather than thick. Then, Thick Max Blocks Sum 84 would be 10 blocks, Thin Blocks Mapped Sum 86 would be 5+5+3=13 blocks, and first reservation estimate 90(a) would be 23 blocks. The count of blocks used 82 would remain 11, and the Thick File Liability Sum 88 would be 6 blocks, so second reservation estimate 90(b) would be 17 blocks. Thus, the reservation size 92 would be the smaller of 90(a), 90(b), or 17 blocks.

Figure 3:
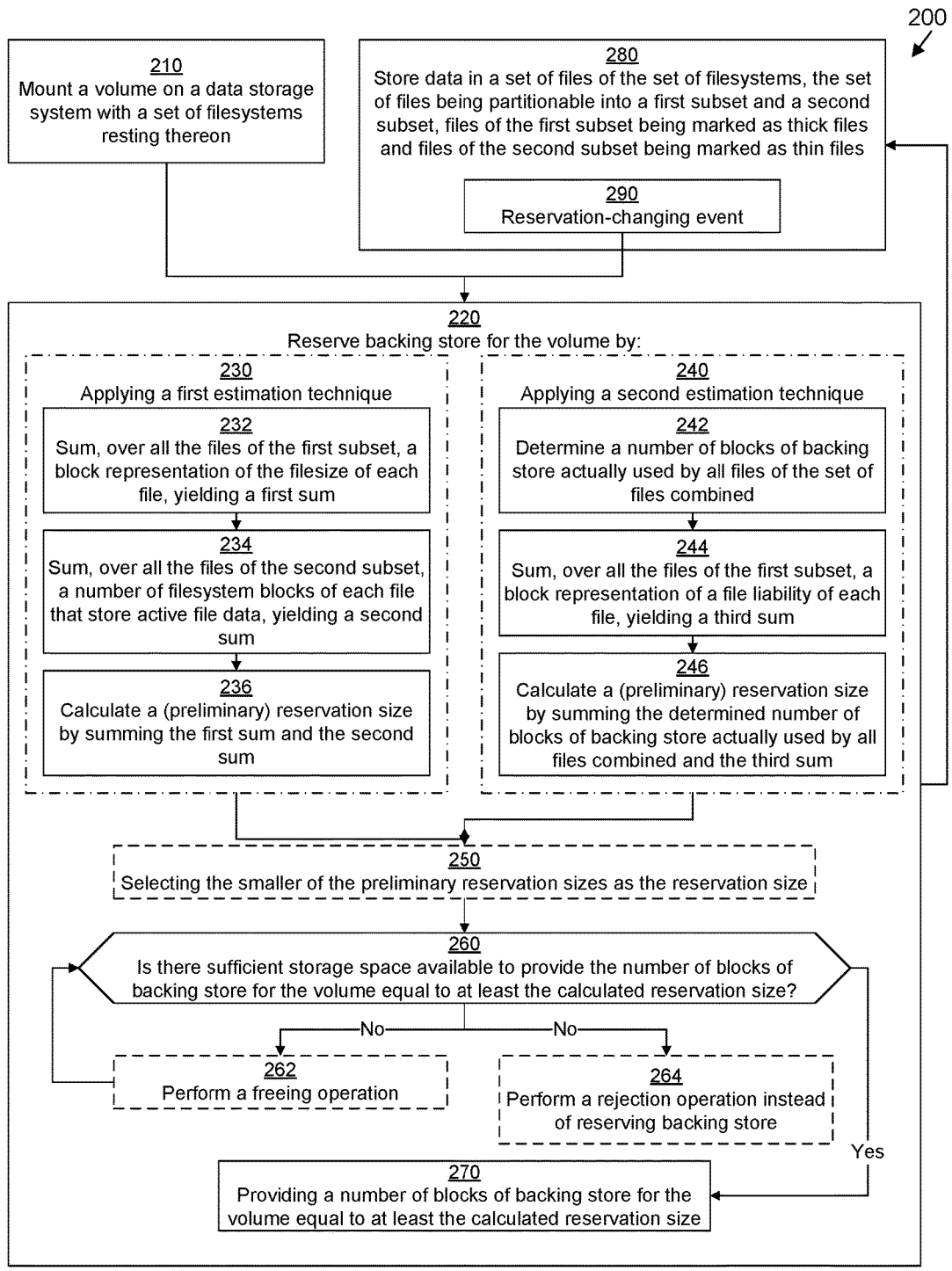
FIG. 3 is a flowchart depicting an example method for use in conjunction with various embodiments.

FIG. 3 illustrates an example method 200 performed by DSS 36. It should be understood that any time a piece of software (e.g., storage processing module 50, reservation manager 52, etc.) is described as performing a method, process, step, or function, in actuality what is meant is that a computing device (e.g., DSS 36) on which that piece of software is running performs the method, process, step, or function when executing that piece of software on its processing circuitry 40.

It should be understood that, within FIG. 3, various sub-steps are dashed because they may be optional and not fundamental to method 200 or because they represent alternatives. However, it should be understood that, in some embodiments, one or more of the other steps or sub-steps may also be omitted. Similarly, in some embodiments, one or more steps or sub-steps may be combined together or performed in a different order. Method 200 is performed by DSS 36, more specifically by its processing circuitry 40 in conjunction with various other system components.

In step 210, Storage Processing Module 50 mounts a volume (e.g., logical volume 54) on the DSS 36, the mounted volume having a set 62 of filesystems 64, 66 resting thereon.

Once a volume and its set 62 of filesystems 64, 66 is mounted, Storage Processing Module 50 may also perform step 280 by storing data (typically in response to storage commands 46(a)) in a set 68 of files 69 of the set 62 of filesystems 64, 66, the set 68 of files 69 being partitionable into a first subset 70 and a second subset 72, files 69 of the first subset 70 being marked as thick files and files 69 of the second subset 72 being marked as thin files. In sub-step 290, one of the storing events from step 280 is a reservation-changing event. A reservation-changing event is a storage command 46(a) that has the possibility to cause the reservation size 92 to change. Further details with respect to sub-step 290 will be discussed below in connection with FIG. 4.

Step 220 is performed in response to step 210 as well as in-response to sub-step 290. In step 220, reservation manager 52 reserves backing store for the volume (e.g., assigning slices 44 to the logical volume 54) by performing various sub-steps 240-270.

At least one of sub-steps 230 and 240 is performed as part of step 220. In some embodiments, only one or the other of steps 230 and 240 is performed, in which case sub-step 250 is skipped. In other embodiments, all three of sub-steps 230, 240, and 250 are performed.

In sub-step 230, reservation manager 52 applies a first reservation technique to calculate the first reservation estimate 90(a). This is accomplished by performing sub-sub-steps 232, 234, and 236. In sub-sub-step 232, reservation manager 52 sums over all the files 69 of thick subset 70, a block representation of the filesize 76 of each file 69 in the tick subset 70, yielding the Thick Max Blocks Sum 84, as described above. In sub-sub-step 234, reservation manager 52 sums over all the files 69 of thin subset 72, a number of filesystem blocks of each file 69 of thin subset 72 that store active file data, yielding the Thin Blocks Mapped Sum 86, as described above. In sub-sub-step 236, reservation manager 52 calculates a (preliminary) reservation size (e.g., first reservation estimate 90(a)) by summing the Thick Max Blocks Sum 84 and the Thin Blocks Mapped Sum 86.

In sub-step 240, reservation manager 52 applies a second reservation technique to calculate the second reservation estimate 90(b). This is accomplished by performing sub-sub-steps 242, 244, and 246. In sub-sub-step 242, reservation manager 52 determines a number of blocks of backing store actually used by all files 69 of the set 62 of files 69, combined. This may be as simple as loading the count of blocks used 82 from the super-block 56 of the logical volume 54. In sub-sub-step 244, reservation manager 52 sums over all the files 69 of thick subset 70, a block representation of a file liability of each such file 69, yielding the Thick File Liability Sum 88, as described above. In sub-sub-step 246, reservation manager 52 calculates a (preliminary) reservation size (e.g., second reservation estimate 90(b)) by summing the count of blocks used 82 and the Thick File Liability Sum 88.

In sub-step 250, reservation manager 52 selects the smaller of the reservation estimates 90(a), 90(b) as the reservation size 92.

In sub-step 260, reservation manager 52 determines whether or not there is sufficient storage space available to provide the number of blocks of backing store for the volume equal to at least the calculated reservation size 92. For example, reservation manager determines whether there are enough slices 44 assigned to the logical volume 54 to cover the reservation size 92. This determination may look only at data blocks (metadata being stored separately) or it may also include the metadata blocks. If there are not enough slices 44 assigned to the logical volume, reservation manager 52 determines whether there are enough free splices 44 available to be assigned to the logical volume 54 to cover the reservation size.

If sub-step 260 yields an affirmative result, operation proceeds directly to step 270 in which reservation manager 52 provides a number of blocks of backing store for the volume (e.g., by assigning slices 44 to logical volume 54) equal to at least the calculated reservation size 92.

If, however, sub-step 260 yields a negative result, operation proceeds with either sub-step 262 or 264.

In some embodiments, a negative result from sub-step 260 always causes sub-step 264 to be performed, in which storage processing module 50 performs a rejection operation, refraining from performing the requested storage command 46(a), instead of reserving backing store. Further details with respect to sub-step 264 will be discussed below in connection with FIG. 6.

In other embodiments, sub-step 262 is performed as long as there is at least one snapshot 66 (or separate replica file 106 in embodiments having replica files 106 separate from snapshots 66) extant. In step 262, storage processing module 50 performs a freeing operation to delete a snapshot 66 (or replica file 106) and recalculate the reservation size 92 in light of the removed snapshot 66 (or replica file 106). Operation then proceeds back to step 260 to ensure that there is now enough space.

In these embodiments, if there are no remaining snapshots 66 or replica files 106, then operation proceeds with sub-step 264.

Upon completing step 220, operation may proceed back to step 280 for additional data storage commands 46(a) to be processed by storage processing module 50.

Figure 4:
FIG. 4 is a flowchart depicting an example method for use in conjunction with various embodiments.

FIG. 4 depicts sub-step 290 in more detail. Various conditions 310, 320, 330, 340, 350 are shown which qualify a storage command 46(a) as a reservation-changing event.

In condition 310, storage processing module 50 receives a write command directed to a previously-unallocated block of a thin file 69 having a thin indicator 75.

In condition 320, storage processing module 50 receives a command to create a new thick file 69 having a thick indicator 74.

In condition 330, storage processing module 50 receives a command to change the filesize 76 of a thick file 69 having a thick indicator 74.

In condition 340, storage processing module 50 receives a command to convert a thick file 69 having a thick indicator 74 into a thin file 69 having a thin indicator 75 or to convert a thin file 69 having a thin indicator 75 into a thick file 69 having a thick indicator 74.

In condition 350, storage processing module 50 receives a command to create a new snapshot 66 (or a new replica file 106).

Figure 5:
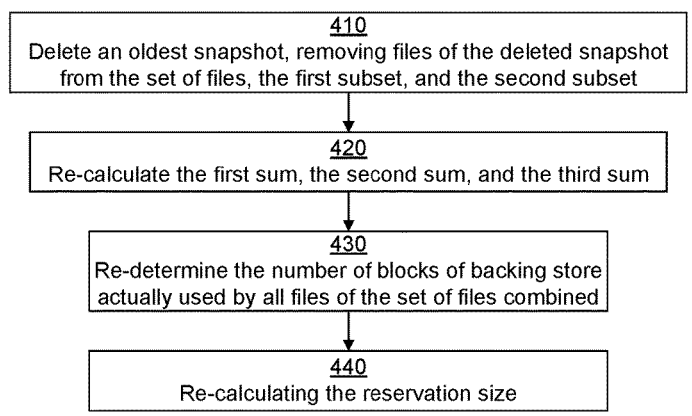
FIG. 5 is a flowchart depicting an example method for use in conjunction with various embodiments.

FIG. 5 depicts sub-step 262 in more detail. In step 410, reservation manager 52 causes a snapshot 66 to be deleted. Typically it is the oldest extant snapshot 66 that is deleted, but, in some embodiments, a different snapshot 66 could be chosen to be deleted. Files 69 that were in the deleted snapshot are deleted by this operation, decreasing the size of the set 68 and the respective subset 70, 72 that the files 69 were in. In addition, any allocated block 58 that was uniquely allocated to one of the deleted files 69 from the deleted snapshot 66 is freed, becoming a reserved block 60 rather than an allocated block.

In step 420, reservation manager 52 re-calculates the Thick Max Blocks Sum 84, the Thin Blocks Mapped Sum 86, and the Thick File Liability Sum 88 (e.g., repeating sub-sub-steps 232, 234, and 244). In step 430, reservation manager 52 re-determines the number of blocks of backing store actually used by all files 69 of the set 62, updating the count of blocks used 82 stored in the super-block 56. Steps 420 and 430 may be performed in parallel. Finally, in step 440, reservation manager 52 re-calculates the reservation size 92 (e.g., repeating sub-sub-steps 236 and 246 and sub-step 250).

Figure 6:
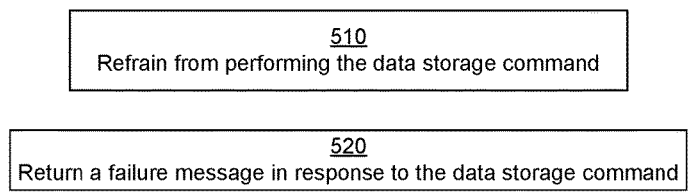
FIG. 6 is a flowchart depicting an example method for use in conjunction with various embodiments.

FIG. 6 depicts sub-step 264 in more detail. In step 510, storage processing module 50 refrains from performing the data storage command 46(a). In step 520, which may be performed in parallel with step 510, storage processing module 50 returns a failure message as storage response 46(b) in response to the storage command 46(a) (instead of the normal storage response 46(b) that would be expected upon executing the storage command 46(a) successfully).

Thus, techniques for more efficiently provisioning storage to filesystems 64, 66 employing Persistent Block Reservation without wasting space have been provided. This may be accomplished by using two different techniques (e.g., sub-steps 230 and 240) for estimating necessary provisioning and reserving space based on the minimum such estimate. One technique involves summing a block filesize of all thick files of the filesystem 64, 66 plus a number of filesystem blocks of each thin file that store active file data. The other technique involves summing a number 82 of blocks of backing store actually used by all files combined plus a file liability of each thick file.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of operating a data storage system to provision space on a volume on which a set of filesystems rest, the method comprising:
    storing data in a set of files of the set of filesystems, the set of files being partitionable into a first subset and a second subset, files of the first subset being marked as thick files and files of the second subset being marked as thin files, files marked as thick each having guaranteed backing store up to a filesize of that file, files marked as thin lacking a guarantee of backing store beyond space actually used by those files, at least one file of the set of filesystems sharing a block with another file of the set of filesystems, wherein the set of filesystems includes one primary filesystem and a plurality of snapshots, each snapshot representing a state of the primary filesystem at a previous time, the at least one file being a file of the primary filesystem and the other file being a file on a snapshot, the other file representing a previous state of the at least one file; and
    reserving backing store for the volume by:
        summing, over all the files of the first subset, a block representation of the filesize of each file, yielding a first sum;
        summing, over all the files of the second subset, a number of filesystem blocks of each file that store active file data, yielding a second sum;
        determining a number of blocks of backing store actually used by all files of the set of files combined;
        summing, over all the files of the first subset, a block representation of a file liability of each file, yielding a third sum;
        calculating a reservation size, wherein calculating the reservation size includes:
            summing the first sum and the second sum;
            summing the determined number of blocks of backing store actually used by all files combined and the third sum, yielding a fourth sum; and
            calculating a minimum of the fourth sum and the sum of the first sum and the second sum, storing the calculated minimum as the reservation size;
        determining whether there is sufficient storage space available to provide the number of blocks of backing store for the volume equal to at least the calculated reservation size, yielding a determination;
        selectively performing a freeing operation in response to the determination being negative, the freeing operation including:
            deleting an oldest snapshot, removing files of the deleted snapshot from the set of files, the first subset, and the second subset;

re-calculating the first sum, the second sum, and the third sum after removing the files of the deleted snapshot;

re-determining the number of blocks of backing store actually used by all files of the set of files combined after removing the files of the deleted snapshot; and re-calculating the reservation size; and providing a number of blocks of backing store for the volume equal to at least the calculated reservation size.

2. The method of claim 1 wherein summing the block representation of the file liability of each file includes calculating the file liability of each file of the first subset by subtracting a number of blocks allocated uniquely to that file from the block representation of the filesize of that file.

3. The method of claim 2 wherein subtracting the number of blocks allocated uniquely to that file from the block representation of the filesize of that file includes reading a pre-stored value of the number of blocks allocated uniquely to that file and a pre-stored value of the filesize of that file from metadata of that file.

4. The method of claim 1 wherein:

all files on the plurality of snapshots are marked as thin files; and the primary filesystem includes both files marked as thin files and files marked as thick files.

5. The method of claim 1 wherein:

the plurality of snapshots includes both files marked as thin files and files marked as thick files; and the primary filesystem includes both files marked as thin files and files marked as thick files.

6. The method of claim 1 wherein reserving backing store for the volume is performed only in response to any of:

the volume becoming mounted on the data storage system;

receiving a write command directed to a previously-unallocated block of a file marked as a thin file;

receiving a command to create a new thick file;

receiving a command to change the filesize of a file marked as a thick file;

receiving a command to convert a file marked as a thin into a file marked as a thick file;

receiving a command to convert a file marked as a thick file into a file marked as a thin file; and receiving a command to create a new snapshot.

7. The method of claim 1 wherein:

reserving backing store for the volume is performed initially upon the volume becoming mounted on the data storage system; and reserving backing store is repeated only in response to receiving a data storage command directing the data storage system to do any of:

write to a previously-unallocated block of a file marked as a thin file;

create a new thick file;

change the filesize of a file marked as a thick file;

convert a file marked as a thin into a file marked as a thick file; and convert a file marked as a thick file into a file marked as a thin file.

8. The method of claim 7 wherein repeating reserving backing store for the volume further includes, prior to providing the number of blocks of backing store for the volume equal to at least the calculated reservation size:

determining whether there is sufficient storage space available to provide the number of blocks of backing store for the volume equal to at least the calculated reservation size, yielding a determination; and selectively performing a rejection operation instead of reserving backing store for the volume in response to the determination being negative, the rejection operation including:

refraining from performing the data storage command; and returning a failure message in response to the data storage command.

9. The method of claim 1 wherein providing the number of blocks of backing store for the volume equal to at least the calculated reservation size includes assigning just enough whole slices of storage to the volume such that the assigned whole slices of storage include at least the number of blocks.

10. An apparatus comprising:

network interface circuitry for communicating with a set of host devices over a network;

data storage providing backing store for a volume on which a set of filesystems rest; and processing circuitry coupled to memory configured to provision space on the volume by:

storing data received from the set of host devices in a set of files of the set of filesystems, the set of files being partitionable into a first subset and a second subset, files of the first subset being marked as thick files and files of the second subset being marked as thin files, files marked as thick each having guaranteed backing store up to a filesize of that file, files marked as thin lacking a guarantee of backing store beyond space actually used by those files, at least one file of the set of filesystems sharing a block with another file of the set of filesystems, wherein the set of filesystems includes one primary filesystem and a plurality of snapshots, each snapshot representing a state of the primary filesystem at a previous time, the at least one file being a file of the primary filesystem and the other file being a file on a snapshot, the other file representing a previous state of the at least one file; and reserving backing store for the volume by:

summing, over all the files of the first subset, a block representation of the filesize of each file, yielding a first sum;

summing, over all the files of the second subset, a number of filesystem blocks of each file that store active file data, yielding a second sum;

determining a number of blocks of backing store actually used by all files of the set of files combined;

summing, over all the files of the first subset, a block representation of a file liability of each file, yielding a third sum;

calculating a reservation size, wherein calculating the reservation size includes:

summing the first sum and the second sum;

summing the determined number of blocks of backing store actually used by all files combined and the third sum, yielding a fourth sum; and calculating a minimum of the fourth sum and the sum of the first sum and the second sum, storing the calculated minimum as the reservation size;

determining whether there is sufficient storage space available to provide the number of blocks of backing store for the volume equal to at least the calculated reservation size, yielding a determination;

selectively performing a freeing operation in response to the determination being negative, the freeing operation including:
deleting an oldest snapshot, removing files of the deleted snapshot from the set of files, the first subset, and the second subset;
re-calculating the first sum, the second sum, and the third sum after removing the files of the deleted snapshot;
re-determining the number of blocks of backing store actually used by all files of the set of files combined after removing the files of the deleted snapshot; and
re-calculating the reservation size; and providing a number of blocks of backing store on the data storage for the volume equal to at least the calculated reservation size.

11. A computer program product comprising a non-transitory computer-readable storage medium storing instructions, which, when executed by computing circuitry of a data storage system, cause the data storage system to provision space on a volume on which a set of filesystems rest by:

storing data in a set of files of the set of filesystems, the set of files being partitionable into a first subset and a second subset, files of the first subset being marked as thick files and files of the second subset being marked as thin files, files marked as thick each having guaranteed backing store up to a filesize of that file, files marked as thin lacking a guarantee of backing store beyond space actually used by those files, at least one file of the set of filesystems sharing a block with another file of the set of filesystems, wherein the set of filesystems includes one primary filesystem and a plurality of snapshots, each snapshot representing a state of the primary filesystem at a previous time, the at least one file being a file of the primary filesystem and the other file being a file on a snapshot, the other file representing a previous state of the at least one file; and reserving backing store for the volume by:
summing, over all the files of the first subset, a block representation of the filesize of each file, yielding a first sum;
summing, over all the files of the second subset, a number of filesystem blocks of each file that store active file data, yielding a second sum;
determining a number of blocks of backing store actually used by all files of the set of files combined;
summing, over all the files of the first subset, a block representation of a file liability of each file, yielding a third sum;
calculating a reservation size, wherein calculating the reservation size includes:
summing the first sum and the second sum;
summing the determined number of blocks of backing store actually used by all files combined and the third sum, yielding a fourth sum; and
calculating a minimum of the fourth sum and the sum of the first sum and the second sum, storing the calculated minimum as the reservation size;
determining whether there is sufficient storage space available to provide the number of blocks of backing store for the volume equal to at least the calculated reservation size, yielding a determination;
selectively performing a freeing operation in response to the determination being negative, the freeing operation including:
deleting an oldest snapshot, removing files of the deleted snapshot from the set of files, the first subset, and the second subset;
re-calculating the first sum, the second sum, and the third sum after removing the files of the deleted snapshot;
re-determining the number of blocks of backing store actually used by all files of the set of files combined after removing the files of the deleted snapshot; and
re-calculating the reservation size; and
providing a number of blocks of backing store for the volume equal to at least the calculated reservation size.

* * * * *